UNITED STATES PATENT OFFICE.

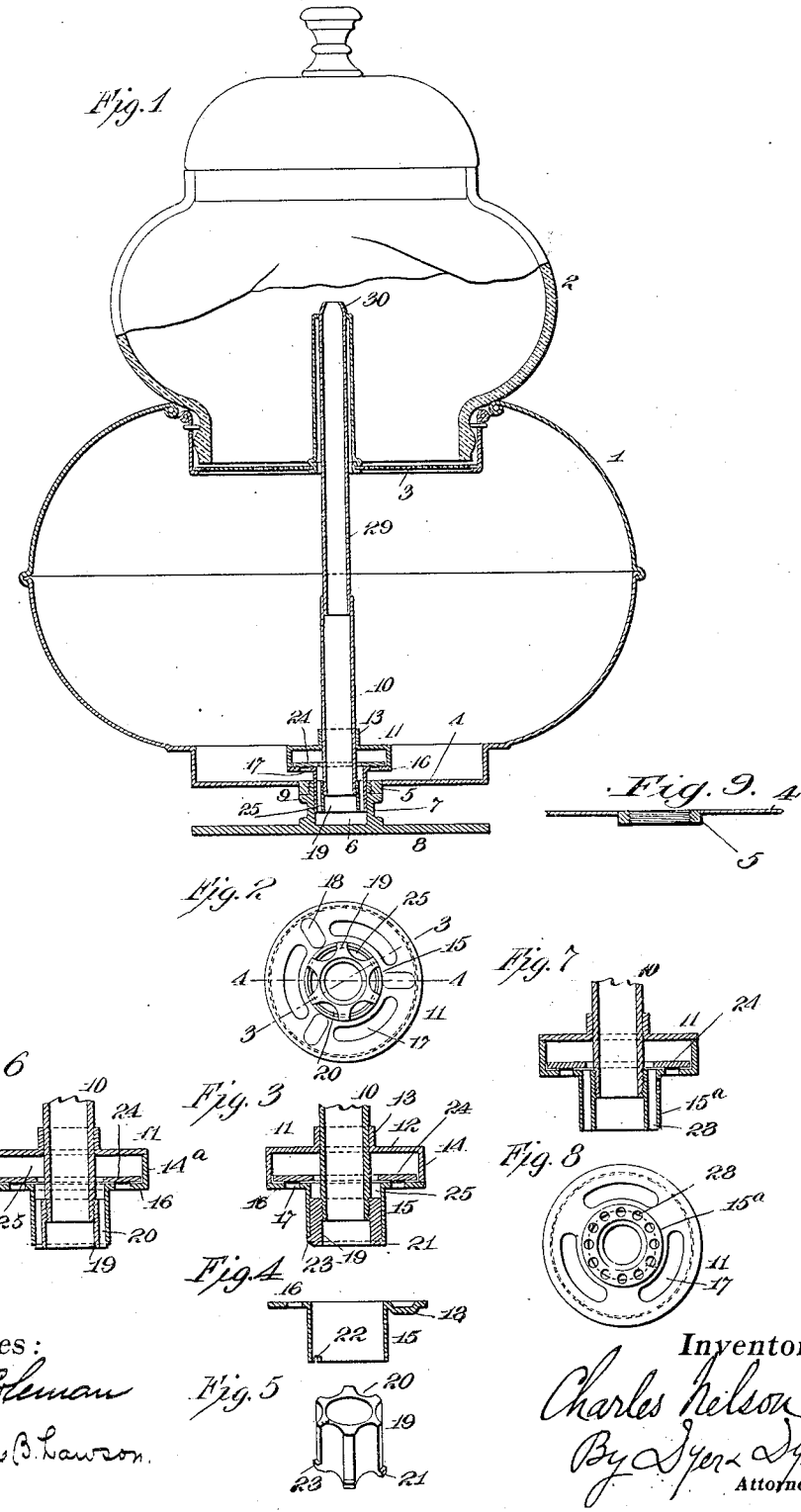

CHARLES NELSON, OF NEW YORK, N. Y., ASSIGNOR TO S. STERNAU & COMPANY, OF BROOKLYN, NEW YORK, A COPARTNERSHIP.

COFFEE-MACHINE.

1,041,850.

Specification of Letters Patent.

Patented Oct. 22, 1912.

Application filed October 30, 1907. Serial No. 399,804.

*To all whom it may concern:*

Be it known that I, CHARLES NELSON, a subject of the King of Sweden, residing in the borough of Brooklyn, in the county of Kings, city and State of New York, have invented an Improvement in Coffee-Machines, (Case J,) of which the following is a specification.

This invention relates to improvements in coffee machines and similar devices in which an infusion of coffee, tea or other substance is made by means of a circulating stream of liquid.

The present invention embodies the same idea contained in my co-pending application for patent filed August 24, 1907, Serial No. 389,997, but certain details of design and construction in connection with the present invention serve to improve the efficiency of the device and also render it much more easily cleansed and at the same time make it cheaper to manufacture. These and other objects will more fully appear from an examination of the following specification and drawings.

In the accompanying drawings: Figure 1 is a longitudinal section of a coffee machine showing my improvements applied. Fig. 2 is a bottom view of the fountain. Fig. 3 is a section of the fountain taken on the line 3—3 of Fig. 2. Fig. 4 is a section of the lower portion of the casing of the fountain taken on the line 4—4 of Fig. 2. Fig. 5 is a detailed perspective view of the inset piece. Fig. 6 is a vertical section of a modified form of fountain; Figs. 7 and 8 are a section and bottom plan view respectively of another modification and Fig. 9 is a detail.
In all of the views like parts are designated by the same reference characters.

I illustrate my invention as applied to a machine for making infusions of coffee, but it is to be understood that the invention can be applied to devices for making infusions of tea and other beverages, and for other analogous purposes.

The device as illustrated comprises a receptacle 1, having a globe 2 at the top thereof, and a screen or other foraminous support 3 for sustaining the coffee or other material of which the infusion is to be made. The bottom 4 of the receptacle is flat with a threaded opening externally shouldered.
This opening may be made by means of a threaded washer 5, which is permanently secured to the bottom by soldering or otherwise, as shown in Fig. 9. As shown, the depth or thickness of the washer is greater than the thickness of the bottom of the receptacle, the inside of the bottom and the upper edge of the washer being flush. The heating chamber 6 is formed in a sleeve 7, of an element which carries a flange 8. The upper end of the sleeve 7 is screw-threaded for engagement with the threads of the washer 5. Below the threads is a small flange 9, which is adapted to closely engage with the bottom of the washer when the sleeve 7 is inserted and screwed up tightly. This will produce a liquid-tight joint. The flange 8 serves the purpose of a means for radiating heat from the lamp or other heating device to the heating chamber. It also serves the purpose of a means for insulating the bottom from the heat produced by the heat-giving device; in connection with a coffee-pot or tea-pot it serves the further purpose of a foot for supporting the pot upon the stove. A much more important advantage is that it serves as a handle, giving increased leverage in screwing the sleeve within the washer and removing it therefrom.

In practice I have made washers of an internal diameter of three-quarters of an inch with the flange of three and five-eighths inches diameter. By this arrangement a perfectly tight joint can be secured between the sleeve and washer, and the parts are readily assembled and separated without the need of any tool. When the sleeve is removed from the washer the inside of the bottom of the receptacle is flush, there being no projections whatever, consequently there are no crevices or corners which would otherwise have to be cleaned; such cleaning can be made with difficulty, and in practice it is not usually done. The inside ͤ the heating chamber 6 is shown as cylindrical in cross section, although this shape is not essential and may be different if desired.

The fountain comprises a tube 10 which constitutes a portion of the outlet passage. To the tube is attached a casing 11, which forms a valve chamber. In the construction which I now prefer, the casing comprises a cover 12, which has a sleeve 13, which is permanently attached to the tube 10 and also has a depending cylindrical flange 14, which constitutes the outer wall of the valve chamber. The other part of the casing comprises an open-ended body 15, having a portion of cylindrical shape somewhat larger than the tube 10; at one end of the cylindrical portion is a flange 16.

The periphery of the flange 16 is adapted to coact with the lower edge of the cylindrical flange 14 and make a tight joint. The flange 16 is provided with inlet ports 17, which in Fig. 2 are shown to be three in number of elongated shape and curved as shown. Between the ports are radial ribs 18 which may be conveniently struck down from the material of which the flange is made. These ribs extend from the cylindrical portion of the body to the periphery of the flange 16, not far enough, however, to interrupt the continuity of that portion of the flange 16 with which the flange 14 engages. The body 15 may be made of a stamping, as may also the cover 12. The tube 10 lies within the casing, and extends down well within the body 15. An inset piece 19 lies within the body 15, and is connected to the tube 10. This inset piece is provided with a central bore or opening, which is provided with screw-threads, such screw-threads engaging with the threaded lower extremity of the tube 10. This forms a means whereby the inset piece is removably connected to the tube 10. The inset piece closely lies within the cylindrical portion of the body 15, and preferably makes a close joint therewith. The outside of the inset piece is provided with a groove 20, such groove being longitudinal and extending from one end to the other of the inset piece. In the embodiment illustrated there are six of such grooves, but the number may be from one to any number desired. These grooves, together with the body of the casing, constitute the inlet passage 25 to the heating chamber 6, while the central opening of the inset piece and the tube 10 constitute the outlet passage. The lower end of the inset piece is provided with fingers 21, which engage with the lower edge of the body 15. The engagement of these fingers with the body serves to hold the inset piece within the casing against the tension of the screw joint. The inset piece holds the body in engagement with the cover, the parts being held together by the engagement of the threads on the inset piece with those on the tube 10. By removing the inset piece, the body of the casing can be removed, and the entire inside of the casing and all parts of the inset piece may be readily cleansed. For the purpose of preventing the inset piece turning within the body when the parts are being screwed together, the lower edge of the inset piece may have a notch 22, which will engage with one of the fingers 21; such finger is shown at 23, being deeper than its fellows, so that when the inset piece is seated, its lower end will lie flush with the lower end of the body 15. The number of notches and engaging fingers may be varied as desired.

The valve 24 is in the form of a flat annulus and rests upon the flange 16 of the body portion 15. The central opening of the valve is sufficiently large to provide a passage from the other part of the casing through the passages 25.

The fountain rests within the chamber 6, assuming the position shown in Fig. 1. The walls of the chamber and the walls of the fountain where they engage are best made with a slight taper so that a close joint is produced and leakage at this point prevented. There should be space enough between the bottom of the chamber and the bottom of the fountain to permit free circulation through the passages 25 into the chamber.

The operation of the device illustrated is as follows: The coffee or other material of which the infusion is to be made is placed upon the screen 3 and the requisite amount of water is introduced into the receptacle 1, the latter entering the casing 11 by lifting the valve 24 off of its seat and exposing the inlet ports 17. The liquid enters the heating chamber 6 through the passages 25, and rises in the tube 10 to the same height as in the receptacle 1, or slightly higher, as depends upon capillary action. Heat is now applied to the bottom of the heating chamber 6 and the flange 8; the water within the chamber 6 is quickly brought to a boil, the expansion of such water and the steam generated at such time lifting the column of water in the tube 10 up through the extension 29 and nozzle 30, spraying the water over the contents of the screen 3. This water will percolate through such material and return to the receptacle. The movement of the liquid in the opposite direction through the fountain is prevented by the seating of the valve 24. This valve always rests upon the flange 16, and closes the ports 17 unless it is lifted by a difference of pressure between the contents of the receptacle and the heating chamber. When this difference of pressure exists the valve is opened and more liquid enters the chamber. The action is continued until an infusion of the desired strength is made, and until the contents of the receptacle is raised to the desired temperature, or both.

I find that the apparatus will produce an ascending current of liquid in a very short time after heat is applied to the chamber 6, using cold water, and I also find that the action can be continued for a long time before the entire contents of the receptacle are heated to such an extent that no further circulation will result.

My invention may be modified in many ways, one modification being shown in Fig. 6. In this modification the flange 14ª is integral with the flange 16, the cover 12 being without a flange. In the modification shown in Figs. 7 and 8 the inset piece is omitted, the body 15ª being of thicker material and being formed with holes 28, which constitute inlet passages. Twelve of such holes are shown, but the number may be varied and their shape may be changed from the cylindrical form illustrated.

For the purpose of increasing the velocity of the ascending liquid in the tube 10, I prefer to connect to the latter an extension 29 of small diameter. The upper end of this extension may be contracted to form a nozzle 30. The effect of the small extension 29 and the nozzle 30 is to convert a portion of the pressure of the ascending liquid into velocity.

The device made in accordance with my invention may be very readily cleansed, as all of the parts may be separated, and there are no small openings or corners which are not readily accessible and which are liable to be overlooked. The apparatus is also very easily and cheaply constructed, and it may be made largely of stampings with a minimum amount of machine work.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is—

1. A fountain for a coffee machine having an outlet tube, a casing connected therewith, and a removable longitudinally grooved inset piece lying within the casing and connected to the outlet tube, the said casing, in conjunction with the inset tube, forming passages.

2. A fountain for a percolator having a casing containing an inlet port, a valve for closing the port, an outlet tube and an inset piece connected to the outlet tube and lying within the casing, the said inset piece having a grooved exterior forming, in connection with the casing, passages from the valve port to the outlet tube.

3. A fountain for a coffee machine having an outlet tube and a casing, the said casing being formed in parts, one of said parts being carried by the outlet tube and having a flange, a grooved inset piece removably connected to the outlet tube, and a portion of the casing being removably connected to the inset piece, and coacting with the flange to complete the casing.

4. A fountain for a coffee machine having an outlet tube, a casing cover permanently secured thereto, the said casing cover having a depending flange, an inset piece with a longitudinal groove removably secured to the outlet tube, the inset piece having a finger, a casing body surrounding the inset piece, and having a notch engaging with the finger, the said casing body having a flange which engages with the depending flange of the cover, the said flange having inlet ports disposed above its circumference and radiating strengthening ribs between the ports, and a valve within the chamber for closing the ports.

5. A fountain for a coffee machine having an inlet tube, a casing cover permanently secured thereto, the said casing cover having a depending flange, a longitudinally grooved inset piece removably secured by screw-threads to the outlet tube, a casing body surrounding and engaging with the inset piece, the said inset piece having a finger and the casing body having a notch, the said casing body also having a flange, the periphery of which engages with the depending flange on the cover and constitutes in cooperation therewith, a valve chamber, a valve within the chamber, the flange of the casing body having a plurality of inlet ports and radiating ribs between the ports, the said ribs extending from the body of the casing to its periphery.

6. A coffee machine having a receptacle with a flat bottom, a washer permanently secured thereto, the said washer having an internal screw-thread, the upper end of the washer being flush with the inside of the bottom of the receptacle, there being an element with a hollow stem, and a flange, the hollow of the stem constituting the heating chamber, the said stem being screw-threaded for engagement with the washer and having a second flange below the threads for engagement with the washer for making a tight joint, the first flange serving the purpose of radiating the heat to the chamber, and also as a means for increasing the leverage in attaching or removing the element.

This specification signed and witnessed this 28th day of October, 1907.

CHARLES NELSON.

Witnesses:
G. L. MILLER,
D. HESSLER.

---

Copies of this patent may be obtained for five cents each, by addressing the "Commissioner of Patents, Washington, D. C."